Oct. 15, 1929.   S. EVANS   1,732,156
DIMMING ATTACHMENT FOR VEHICLE HEADLIGHTS
Filed Feb. 2, 1928
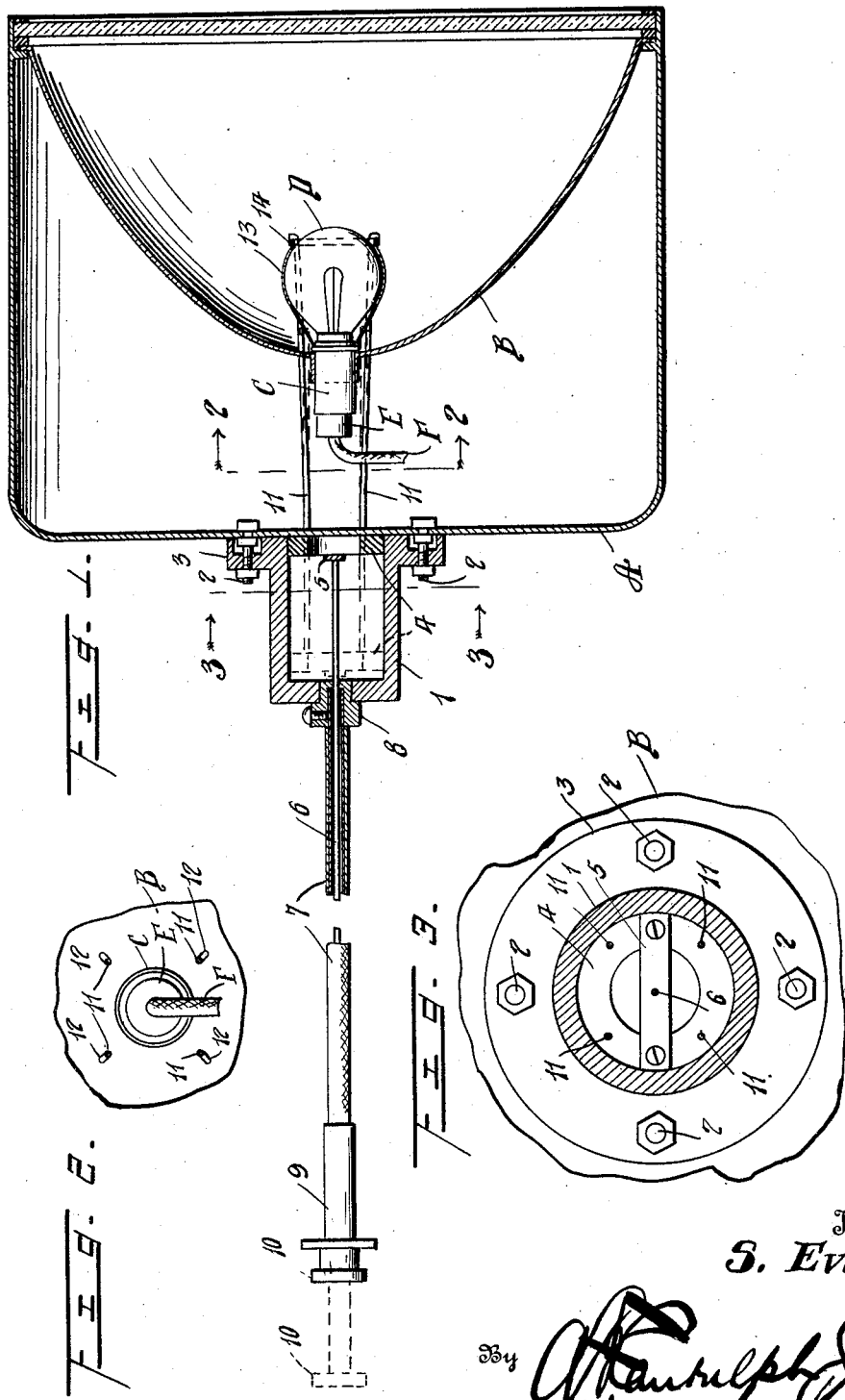
Inventor
S. Evans.
By
Attorney Patented Oct. 15, 1929

1,732,156

UNITED STATES PATENT OFFICE

SOLOMON EVANS, OF PILGRIM'S REST, TRANSVAAL, SOUTH AFRICA, ASSIGNOR TO ECLIPSE DIFFUSERS (PROPRIETARY) LTD., OF JOHANNESBURG, TRANSVAAL, SOUTH AFRICA

DIMMING ATTACHMENT FOR VEHICLE HEADLIGHTS

Application filed February 2, 1928. Serial No. 251,422.

The invention relates to the headlights of vehicles such for instance as motor vehicles, bicycles, and the like, and has for its principal object the provision of means under the control of the operator of the vehicle to dim the rays of light from the headlights when it is necessary to do so to prevent interfering with a driver of an approaching vehicle.

A further object of the invention is the provision of a dimming attachment for vehicle headlights comprising a tubular member of any suitable fabric or flexible material, that has one of its ends secured to the socket for receiving the electric lamp bulb of the headlight, and its other end secured to the ends of rods slidably mounted relatively to the lamp bulb and adapted to be actuated by the operator of the vehicle to stretch the tubular member on the bulb to intercept and diffuse the rays of light to the reflector of the headlight and prevent glare from the headlights being thrown forwardly of the vehicle.

The invention will be described in detail hereinafter and will be found illustrated in the accompanying drawings in which Figure 1 is a central vertical sectional view of a conventional headlight showing the dimming attachment applied thereto, and Figures 2 and 3 are sectional details made on planes indicated by the lines 2—2, and 3—3, respectively, of Figure 1.

In the drawings similar reference characters are used to designate corresponding parts throughout the several views.

In Figure 1 the invention is shown applied to a conventional headlight in which A designates the casing, B the reflector, C the socket for the lamp bulb D, and a plug E on the end of the wire cable F. The attachment comprises a housing 1 that is secured to the casing A by means of bolts 2 engaged through the circumferential flange 3 on the housing. Slidably mounted in the housing 1 is a plunger comprising a ring 4 having a cross bar 5 secured thereto to which is secured a rod 6 contained within a flexible casing 7 secured at one end to the socket 8 engaged in the end of the housing 1 while its other end is provided with a sleeve 9 adapted to be mounted in the instrument board of the motor vehicle or otherwise supported. 10 indicates an operating knob on the end of the rod 6.

Secured to the plunger ring 4 is a plurality of rods 11, preferably four as shown in the drawing, said rods being slidable with said plunger ring 4 through the casing A and slotted openings 12 in the reflector B, said slotted openings being provided so that the rods may flex slightly to follow the contour of the surface of the lamp bulb D. Secured to the ends of the rods 11 is a tubular member 13 of any suitable fabric, such for instance as silk, cotton or linen cloth, said tubular member 13 being secured at one end to the free end of said rods 11, and has its other end secured in any suitable manner to the socket C, so that in the forward movement of the rods 11 when the plunger 4 is moved into the position shown in full lines in Figure 1, the tubular member 13 is stretched partially around the bulb D to intercept and diffuse light rays from said bulb and prevent them from being reflected from the reflector B and thus cut off the glaring light from the headlights but permitting sufficient light to illuminate the road ahead of the vehicle. When the plunger ring 4 is moved into position shown in broken lines in Figure 1, the rods will be withdrawn to the rear of the bulb D and the tubular member 13 will also be withdrawn from engagement with the lamp bulb D to permit light rays from the bulb D to be reflected from the reflector B. In order to hold the ends of the rods 11 in engagement with the surface of the bulb D for the more effectual operation of the device, a resilient band of rubber or other suitable material 14 is provided, this insuring that the tubular member 13 will be held in engagement with the bulb to most effectually intercept the rays of light as hereinbefore stated, by diffusing same.

What is claimed is:—

A headlight, comprising a casing, a reflector, and a lamp bulb, the casing and reflector being provided with openings, the openings in the reflector being elongated radially thereof, a housing secured to said casing, a plunger slidably mounted in said housing, rods secured to said plunger and extending through the openings in the casing and reflector, a tubular member of flexible material secured at one end adjacent to the base of the lamp bulb and at its other end to the free ends of said rods, said tubular member being adapted to be stretched around said bulb and to be withdrawn therefrom by actuation of said rods, means engaging said plunger to actuate it and the rods, and a resilient member engaging said rods to hold them and the tubular member in engagement with the bulb.

In testimony whereof I affix my signature.

SOLOMON EVANS.